Feb. 6, 1951  C. E. JAYCOX  2,540,584
TROLLING FIXTURE
Filed Nov. 17, 1949  2 Sheets-Sheet 1
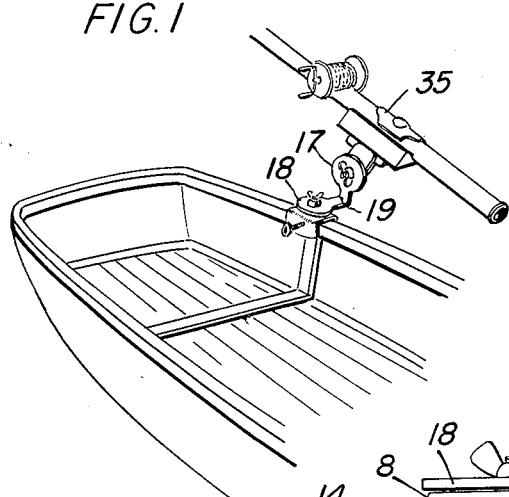
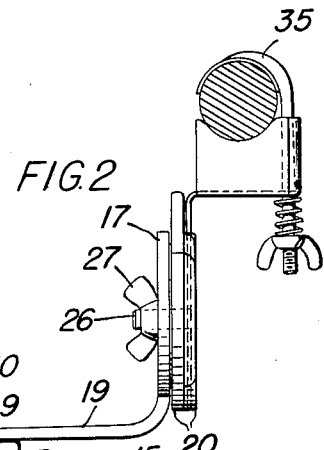
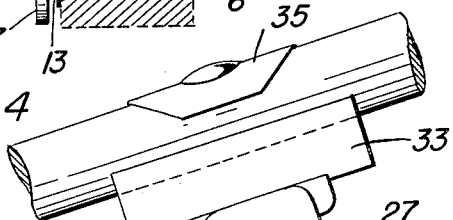
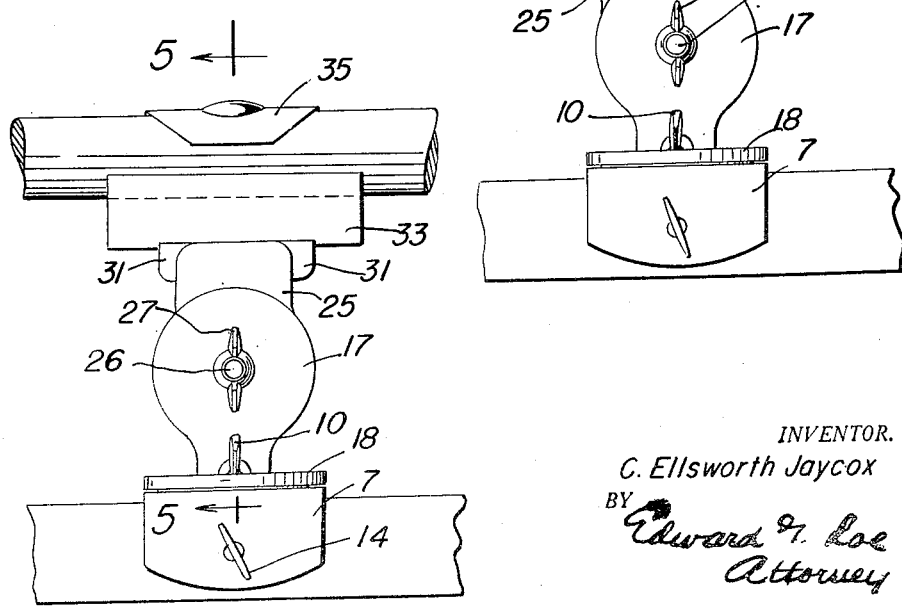
INVENTOR.
C. Ellsworth Jaycox
BY
Edward F. Loe
Attorney Feb. 6, 1951     C. E. JAYCOX     2,540,584
TROLLING FIXTURE
Filed Nov. 17, 1949     2 Sheets-Sheet 2
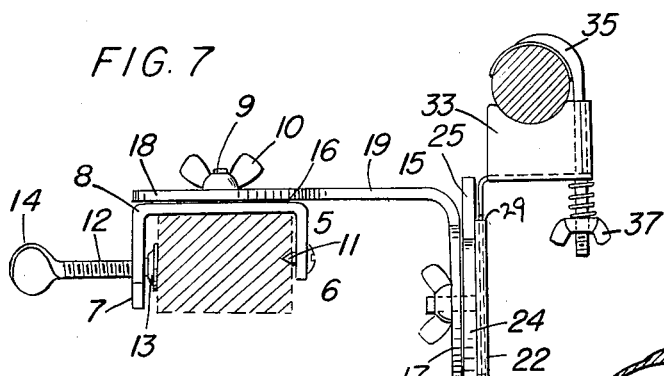
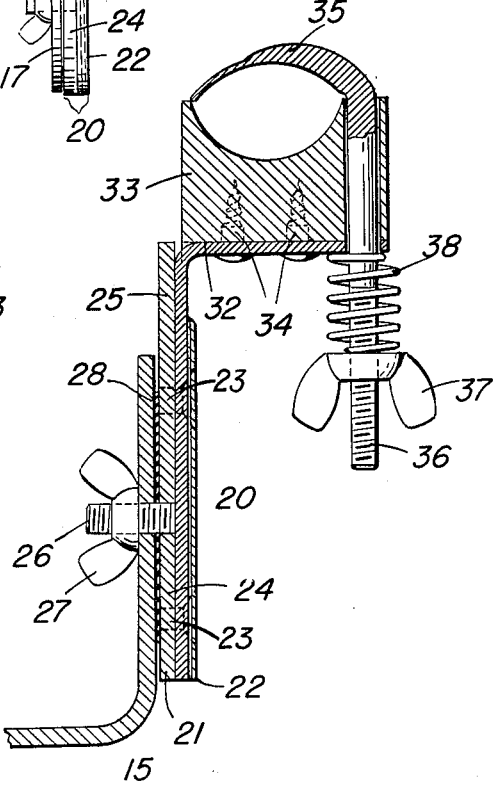
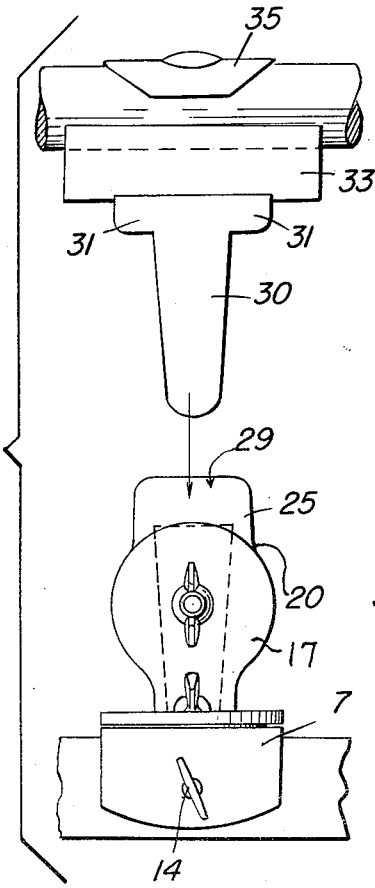
INVENTOR.
C. Ellworth Jaycox
BY
Edward F. Roe
Attorneys Patented Feb. 6, 1951

2,540,584

UNITED STATES PATENT OFFICE 2,540,584

TROLLING FIXTURE

Charles Ellsworth Jaycox, Cos Cob, Conn.

Application November 17, 1949, Serial No. 127,826

2 Claims. (Cl. 248—42)

The invention relates to trolling fixtures, and more particularly to an improved device which is adapted to adjustably support a fishing rod. The invention will hereinafter be referred to either as a trolling fixture, a fishing rod support, rod holder, or fishing rod holder, all of these appellations being intended to refer to the subject matter of the invention.

It has usually been necessary, when trolling, for the fisherman to manually hold the rod in position ready for a strike while the boat is rowed or otherwise handled by a guide or companion. No rod holder has been, to my knowledge, heretofore designed which would enable the fisherman to have the rod and reel positively held in trolling position and manipulate the boat himself.

I have invented a trolling fixture which provides the maximum in inherent strength, adjustability and instant availability of fishing equipment when a strike is had.

A prime object of the invention comprehends the provision of a trolling fixture incorporating structural features marshalled into one compact, adjustable assembly which will enable the fisherman to (1) place and securely hold the rod and reel in any desired position (2) to provide a fixture which will fix the fishing equipment in upright position at all times (3) a rod holder from which it is impossible to lose equipment due to a heavy strike, roll of the boat, or for any other reason (4) a rod holder adjustable to the maximum degree both horizontally and vertically (5) a support wherein the rod and reel are instantly available for removal therefrom when desired.

Briefly described, my trolling fixture comprises an assembly including what I style a clamp adapted to be adjustably secured to the gunwale or other accessible location in the boat and provided with a mounting stud and adjustable wing nut.

Cooperating with and swiveled on the stud of the clamp is a swivel L-shaped base consisting of two centrally bored discs integrally connected by an elongated body portion formed to a 90° angle toward one end, promoting and permitting a double action swivel, as will more fully be hereinafter explained.

The disc 90° angled from that which is swiveled to the clamp carries a member styled as a bayonet sheath swivel, the latter also having a centered mounting stud journalled through the said disc.

A combination rod clamp and bayonet removably seated in the sheath completes the assembly.

Objects and advantages of the invention other than these referred to above will be apparent after a perusal of the drawings and detailed description hereafter.

In the drawings:

Fig. 1 is a perspective view of the trolling fixture shown mounted on a boat and supporting a fishing rod in outboard position and showing its adaptability to be swung to inboard position, if desired, or mounted on the opposite side or other position on the boat.

Fig. 2 is an end view of the invention.

Fig. 3 is a side elevational view similar to Fig. 2.

Fig. 4 is a side elevational view with the fixture adjusted for trolling.

Fig. 5 illustrates a cross-sectional view taken along lines 5—5 of Fig. 2.

Fig. 6 is a view showing the rod clamp and bayonet removed from the bayonet sheath swivel.

Fig. 7 is an end view showing the swivel right angled base in downward position, or oppositely disposed from the position shown in Figs. 1, 2, 3, 4, 5 and 6.

In the drawings clamp 5 is inverted U or arch-shaped having depending sides 6, 7 and top 8. Stud 9 is fixedly mounted centrally of top 8 with wing nut 10 threaded thereon, while conical spurs 11 are fixed in and project inwardly of side 6. Side 7 has threaded therethrough a stem 12 having pivoted head 13 and winged end 14.

Cooperating with and pivoted to clamp 5 on stud 9 is what I style swivel right angled base 15, having a thin leather or other gripping washer 16 therebetween for preclusion of relative movement, and having disposed at a 90° angle to each other a pair of discs 17, 18 centrally bored and formed integrally with and connected by elongated body portion or palm 19 extending from disc 18 and bent at a 90° angle to connect with disc 17.

As shown in Fig. 3, clamp 5 and swivel base 15 may be cast of one piece and for strength, rigidity and resistance to stress and strain I prefer metal of suitable strength as a preferable material, although other materials having these characteristics might be employed.

The bayonet sheath swivel 20 comprises a pair of plates 21, 22 integrally connected together as by screws 23.

Plate 21 may be formed with its lower portion 24 disc-like to conform in outline to disc 17, having upper extending rectangular-like portion 25 with stud 26 fixed centrally of said plate, adapted to extend through the central bore of disc 17, with adjustable and complementally threaded wing nut 27 and a thin washer 28 separating disc 17 and plate 21 when the members are assembled, also to preclude relative movement when the discs and the plate are adjusted and tightened together.

Plate 22, shown in Figs. 5, 6 and 7, is vertically recessed to form sheath 29 with the opposite sides of the recess converging toward the bottom thereof, as indicated in Fig. 6, and the top of said plate 22 is spaced below the top of plate 21—to provide facile access to the sheath 29.

Adapted to be seated within said sheath I provide bayonet 30 having shoulders 31 and horizontal extension 32 upon which is fixedly mounted concaved rod holder 33, as by screws 34, as best illustrated in Fig. 5. The rod holder 33 is preferably but not necessarily made of concaved block hard wood, and the bottom thereof may be recessed to receive extension 32, with its upper concaved portion adapted to adjustably receive a fishing rod butt between it and the oppositely concaved clamp 35 having integral and depending threaded stem 36 carrying complementally threaded wing nut 37 and spring washer 38.

The swivel base 15 is adjustable through a full 360° arc of a circle centered at swivel point 9 so that, if desired, the clamp 5 may be affixed to either the right or left gunwale of a boat or to any other support on the boat by a simple manipulation of wing end 14 of stem 12 to grip the support between the confronting spurs 11 and head 13. The swivel base may further be swung to inboard of the boat oppositely disposed to the outboard position shown in Fig. 1. Upon affixation to the desired support, the base 15 is swiveled and horizontally adjusted and tightened to the desired point by manipulation of wing nut 10, while full vertical adjustment is provided by bayonet sheath 20 swiveled to disc 17 on stud 26. With the rod butt of a fishing rod gripped between clamp 35 and concaved rod holder 33, upon tightening of wing nut 37, and with bayonet 30 seated in sheath 29, the fisherman can handle the boat with rod and reel positioned for trolling. Upon a strike the fishing equipment is instantly available by grasping the rod handle and removing bayonet 30 from sheath 29.

Additionally swivel base may be disposed with disc 17 downwardly, as shown in Fig. 7.

My trolling fixture, while permitting the maximum adjustment horizontally and vertically, and, as stated before, adapted to be positioned on either right or left hand of the boat, or at any other preferred point, positively prevents loss of equipment due to heavy strikes, roll of boat, or for any other outboard development, and is of maximum strength.

I contemplate various modifications such as providing the confronting faces of disc 18 and top 8; disc 17 and plate 21, with radiating and mating serrations (not shown) to preclude undesired relative movement when the members are tightened together, instead of the washers shown. Additionally, I contemplate that the fixture might be used for other uses than trolling.

I reserve the right to make such changes and modifications as may come within the scope of the appended claims.

I claim:

1. A trolling fixture assembly for supporting a fishing rod on a boat including a clamp for attachment to the boat; an L-shaped base portion comprising a pair of centrally bored discs integrally connected by a body portion at substantially right angles to each other, with one disc pivotally mounted on the clamp; a disc-like member having a recess therein pivoted on the other disc of the L-shaped base portion; a clamp adapted to grip a fishing rod, said clamp having a depending shank adapted to be snugly and removably received within the recess of the disc-like member; and means for holding the clamp, L-shaped base portion, disc-like member and rod clamp portion in assembled relationship.

2. A trolling fixture assembly for adjustably supporting a fishing rod on a boat including: an inverted U-shaped clamp having depending sides and a top, the sides provided with means to clamp a gunwale or other support therebetween, the top having a threaded mounting stud and nut; a swivel base portion having a pair of centrally bored discs disposed at right angles to each other and integrally connected by an elongated body portion; a disc-like member comprising a pair of plates, one plate recessed to form a lower converging sheath, the other plate carrying a centrally disposed mounting stud, the swivel base having one disc mounted for rotatable adjustment on the stud of the clamp portion, the other disc mounted on the stud of the sheath portion for adjustment of the latter; a combined rod clamp and a depending bayonet, the said bayonet adapted to be removably received within the sheath, the rod clamp adapted to receive and hold the butt of a fishing rod.

C. ELLSWORTH JAYCOX.

REFERENCES CITED

The following references are of record in the file of this patent:

UNITED STATES PATENTS

| Number | Name | Date |
|---|---|---|
| 413,131 | Chappell | Oct. 15, 1889 |
| 416,755 | Schoenike | Dec. 10, 1889 |
| 923,596 | Staples | June 1, 1909 |
| 2,184,583 | Danko | Dec. 26, 1939 |
| 2,301,885 | Laehr | Nov. 10, 1942 |